United States Patent
Lyons et al.

(10) Patent No.: US 7,188,354 B2
(45) Date of Patent: Mar. 6, 2007

(54) SPLICING COMPRESSED, LOCAL VIDEO SEGMENTS INTO FIXED TIME SLOTS IN A NETWORK FEED

(75) Inventors: Paul W. Lyons, New Egypt, NJ (US); Alfonse A. Acampora, Staten Island, NY (US); John P. Beltz, Willingboro, NJ (US)

(73) Assignee: Leitch Incorporated, Chesapeke, VA (US)

( * ) Notice: Subject to any disclaimer, the term of this patent is extended or adjusted under 35 U.S.C. 154(b) by 1033 days.

(21) Appl. No.: 09/912,433

(22) Filed: Jul. 25, 2001

(65) Prior Publication Data
US 2002/0061067 A1 May 23, 2002

Related U.S. Application Data

(60) Provisional application No. 60/220,671, filed on Jul. 25, 2000.

(51) Int. Cl.
*H04N 7/025* (2006.01)
*H04N 7/10* (2006.01)
(52) U.S. Cl. .................... 725/32; 375/240.28
(58) Field of Classification Search .............. 725/32, 725/34–36, 94; 375/240–242; 370/300, 370/342, 343, 349, 389, 381–383, 465, 468, 370/537, 538, 540
See application file for complete search history.

(56) References Cited

U.S. PATENT DOCUMENTS

| | | | | |
|---|---|---|---|---|
| 5,859,660 A | * | 1/1999 | Perkins et al. | 725/32 |
| 5,917,830 A | * | 6/1999 | Chen et al. | 370/487 |
| 6,038,000 A | * | 3/2000 | Hurst, Jr. | 375/240.26 |
| 6,075,551 A | | 6/2000 | Berezowski et al. | 348/9 |
| 6,137,834 A | * | 10/2000 | Wine et al. | 375/240 |
| 6,345,122 B1 | * | 2/2002 | Yamato et al. | 382/232 |
| 6,370,199 B1 | * | 4/2002 | Bock et al. | 375/240.28 |
| 2002/0080875 A1 | * | 6/2002 | Tahara et al. | 375/240.02 |

* cited by examiner

*Primary Examiner*—John Miller
*Assistant Examiner*—John Manning
(74) *Attorney, Agent, or Firm*—Anthony B. Diepenbrock, III; Dechert LLP

(57) ABSTRACT

A method for seamlessly splicing a local commercial segment into an existing network time slot, without decoder buffer overflow or underflow. The vbv_delay of the commercial segment is manipulated (e.g., for a minimum delay or a maximum delay). The pictures from the commercial segment are output for at least a portion of the associated network time slot duration. A determination is made regarding the number of pictures remaining in a stored portion of the incoming network feed or the commercial segment and the output rate is adjusted as required. The vbv_delay of the stored network feed or the vbv_delay of the local commercial segment is adjusted to match the vbv_delay of the incoming network feed.

7 Claims, 2 Drawing Sheets

Fixing the Problem After the Fact

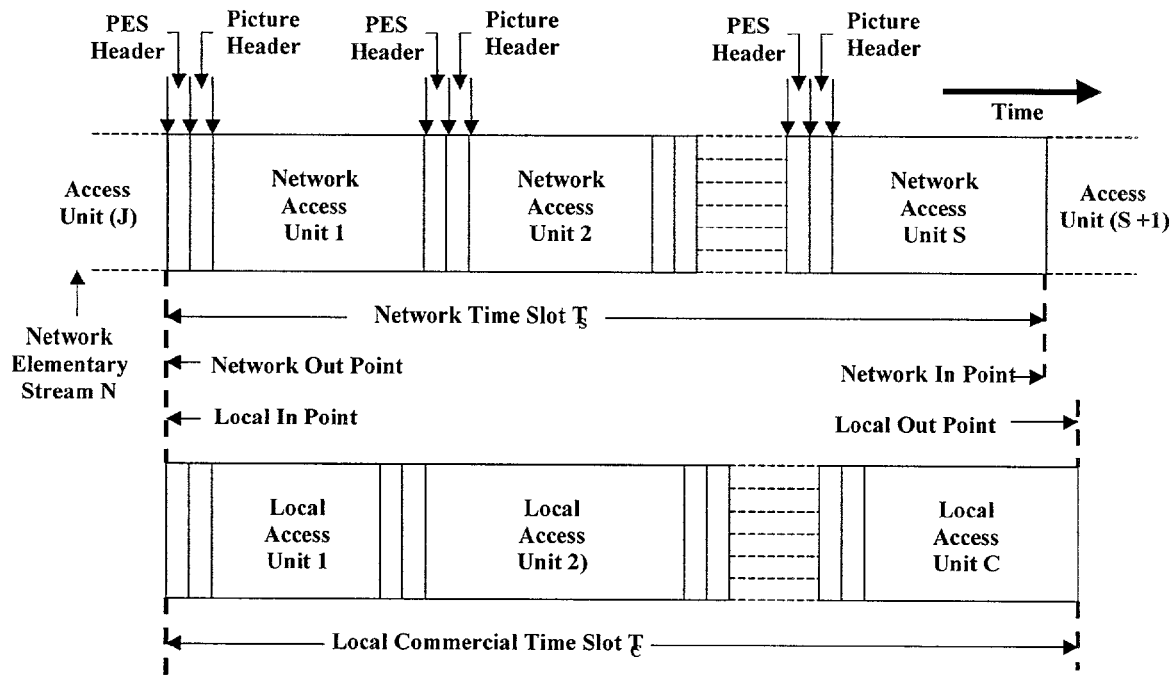
Figure 1. Network and Local Time Slot Arrangement
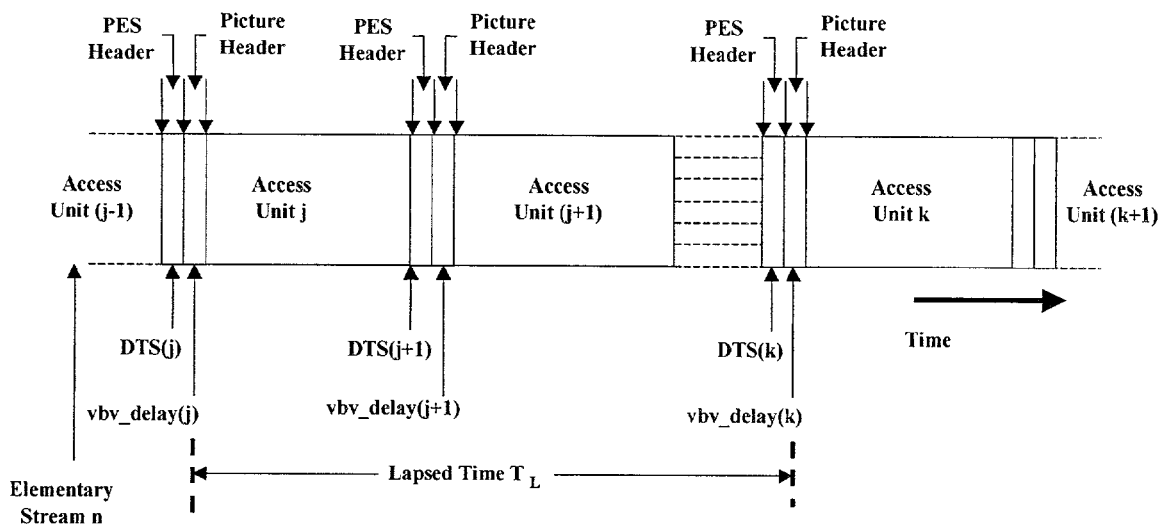
Figure 2. Lapsed Time From DTS and vbv_delay Parameters

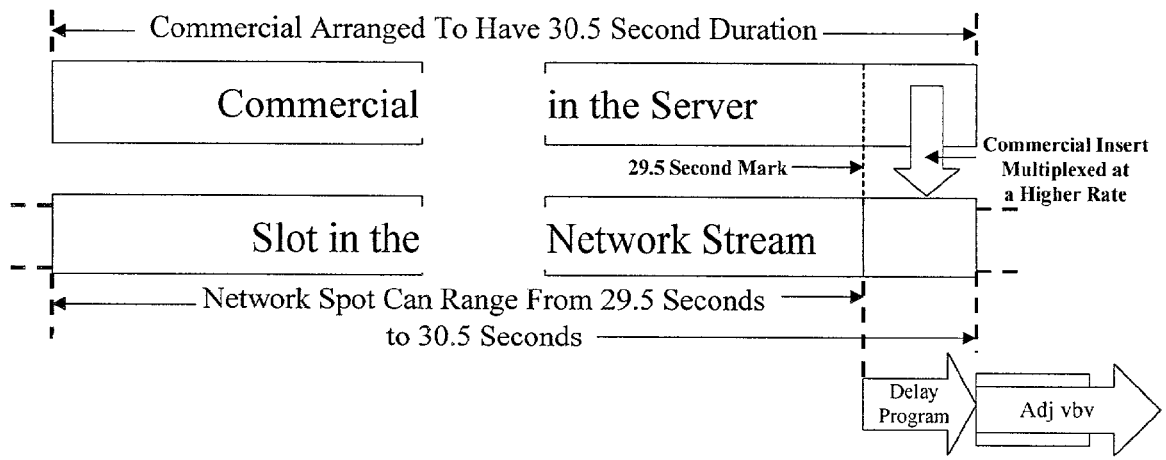
Figure 3. Fixing the Problem After the Fact
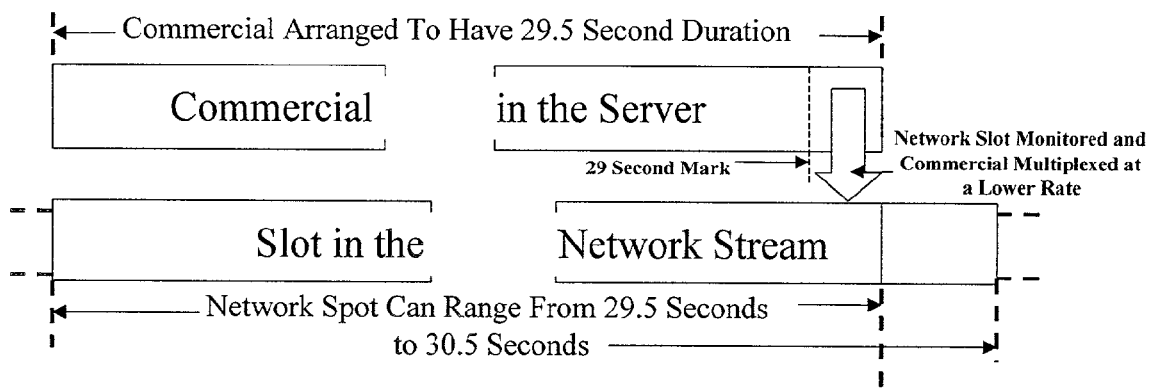
Figure 4. Fixing the Problem Before the Fact

SPLICING COMPRESSED, LOCAL VIDEO SEGMENTS INTO FIXED TIME SLOTS IN A NETWORK FEED This application claims the benefit of Provisional Patent Application Ser. No. 60/220,671, filed Jul. 25, 2000.

GOVERNMENT INTERESTS

This invention was made with U.S. government support and funded by NIST under contract number 70NANB5H1174. The U.S. government has certain rights in this invention.

The present invention relates to the generation of digital video signals. In particular, the invention is directed to improvements to video splicing in order to simplify the design requirements of a downstream receiver, especially by lowering the required processing speed.

The goal of splicing compressed bit streams is to change from one compressed source to a second compressed source with no disruption in the decoded program, while maintaining bitstream compliance through the transition. In general, input streams are de-multiplexed to the packetized elementary stream (PES) level before being processed by individual elementary stream type processors. Program video is spliced at access unit (picture) boundaries, and a continuous flow of time stamped video (and audio frames), without timing discontinuities, is maintained in the output stream.

Video splicing techniques can include the examination of incoming streams to extract stream parameters that are used to determine stream entry and exit points and calculates values required by the outgoing stream. Exit points are found in the current output stream while entry points are found in the next output stream.

Seamless entry/exit point indicators can be found by analysis of the types of the neighboring pictures. Specifically a seamless exit from a stream can be made at the end of a picture preceding an anchor picture. This identifies a naturally occurring exit point in the original stream. Seamless entry points can be identified by (1) the start of a closed GOP or (2) an Intra coded (I) picture followed by an anchor picture or (3) an I picture followed by a predictive picture using only backward prediction or intra coding.

The difficulty of switching from one compressed stream to a second compressed stream, by finding suitable exit and entry point, is eased by the fact that the actual switch point can generally be within a picture or two of the switching command (in order to maintain the seamless aspect) without noticeable visual effect. However, when a rigorously defined network time slot, possibly occupied by a network commercial, is replaced by an equally rigorously defined local insertion, care must be taken to correctly fill the slot, because segment replacement must be exact.

SUMMARY OF THE INVENTION

The invention is directed to a method for seamlessly splicing a local commercial segment into an existing network time slot, without decoder buffer overflow or underflow. In particular, the invention encompasses a method of splicing an incoming network feed having a network time slot duration and an associated vbv_delay with a commercial slot duration having an associated vbv_delay. The vbv_delay of the commercial slot vbv_delay is manipulated between one of a minimum delay and a maximum delay. The pictures from the compressed commercial slot are output for at least a portion of the network time slot duration. The number of pictures remaining is then determined (i.e., the remaining pictures from either a stored portion of the incoming network feed or the commercial slot). The output rate (of the remaining pictures from either the stored portion of the incoming network feed or the commercial slot) is adjusted as required to output the commercial slot. The vbv_delay of either the stored network feed or the vbv_delay of the local commercial slot is then adjusted to match the vbv_delay of the incoming network feed.

In a preferred embodiment, the commercial slot vbv_delay is manipulated for a maximum delay. Pictures from the compressed commercial slot are output for the network time slot duration. Any remaining pictures from the commercial slot are output by, storing at least a portion of the incoming network feed, outputting the remaining pictures at an increased output rate and then outputting the stored portion of the network feed. The network time slot vbv_delay is also adjusted until the vbv_delay of stored network feed matches the vbv_delay of the incoming network feed.

In yet another preferred embodiment, the commercial slot vbv_delay is manipulated for a minimum delay. Pictures from the compressed commercial slot are output for at least a portion of the network time slot duration. The number of pictures remaining from the commercial slot are determined and the output rate is adjusted as required to complete the network time slot duration. The local commercial slot vbv_delay is also adjusted to match the vbv_delay of the incoming network feed.

Yet another embodiment of the present invention is a method of splicing a stream of a commercial time slot into a network time slot of an incoming network stream, where the commercial time slot and network time slot each have an in-point and out-point and a duration. The method includes the steps of (i) multiplexing the commercial stream into the network stream such that the commercial slot in-point is aligned with the network slot out-point, (ii) during the commercial stream, adjusting the vbv_delays of that stream such that the duration of the commercial stream has a maximum duration that is longer than the duration of the network time slot, where any difference in durations is equal to the network feed extra; (iii) at the network stream in-point, multiplexing any remaining portion of the commercial stream at a higher stream rate, and storing any network feed extra, and (iv) at the commercial stream out-point, multiplexing any stored network feed extra into the network stream while adjusting the vbv_delays of the stored network feed extra until the vbv_delays in the network feed extra match that in the incoming network feed.

Yet another embodiment of the present invention is a method of that includes the steps of (i) multiplexing the commercial stream into the network stream such that the commercial slot in-point is aligned with the network slot out-point, (ii) while multiplexing the commercial stream into the network stream, computing an expected completion time of the network time slot by monitoring the network feed, and adjusting the vbv_delays of the commercial stream such that the duration of the commercial stream has a minimum duration that is shorter than the duration of the network time slot, (iii) between a prescribed point prior to the out-point of the commercial time slot and the out-point of the commercial time slot, multiplexing the remaining portion of the commercial stream at a slower stream rate by adjusting the vbv_delays to meet the expected completion time, and (iv) at the network in-point, multiplexing the incoming network feed into the network stream.

In yet another preferred embodiment at least a portion of the incoming network feed is stored and delayed. The network time slot duration is determined based on a Decode Time Stamp and a network time slot duration time tolerance. The commercial slot vbv_delay is manipulated so that the commercial slot duration substantially matches the network time slot duration. The incoming network feed is output after completion of the network time slot duration.

BRIEF DESCRIPTION OF THE DRAWINGS

FIG. 1 shows network and local time slot arrangement in accordance the invention.

FIG. 2 shows the lapsed time from DTS and vbv_delay parameters in accordance with the invention.

FIG. 3 shows the relative duration of the network slot and a commercial insert with the vbv_delay of the commercial insert manipulated to a maximum value in accordance with the invention.

FIG. 4 shows the relative duration of the network slot and a commercial insert with the vbv_delay of the commercial insert manipulated to a minimum value in accordance with the invention.

DETAILED DESCRIPTION OF THE INVENTION

Consider a network Elementary Steam, N, shown in FIG. 1, where a sequence of S Network Access Units (pictures), numbered 1 through S, are embedded in the stream. This sequence represents a network time slot, possibly a network advertisement, that is to be replaced with a sequence of C Local Access Units, numbered 1 through C, representing a local time slot, possibly a locally inserted commercial.

The Out Point from the network is at the start of Network Access Unit 1, which coincides with the start of Local Access Unit 1. Similarly, the In Point of the return to the network occurs after Network Access Unit S. The Out Point from the local commercial occurs after Local Access Unit C.

Knowing the start time and the final presentation duration of a commercial is insufficient to determine how to insert a compressed local commercial into the stream in the time slot provided by the network when the compressed streams are not further constrained. The time slot in the stream, $T_s$, is a variable equal to the presentation time, $P_s$ of the slot plus or minus some tolerance, $\Delta_s$. Similarly, the compressed commercial, stored locally, has a variable time slot, $T_c$, equal to its presentation time, $P_c$ plus or minus some tolerance, $\Delta_c$. That is, $$T_s = P_s +/- \Delta_s \text{ and } T_c = P_c +/- \Delta_c$$

Normally, the number of network Access Units equals the number of local commercial Access Units if both the network slot and the commercial slot have the same frame rate, i.e., S=C. However, when S≠C, as in the case of inserting a 24 frame/second segment into a 30 frame/second slot, the number of Access Units in each segment must be proportionally arranged so that Ts≡Tc.

Determining the delta tolerances involved with the time slot duration is critical to understanding the invention of splicing a local segment into an existing network time slot.

Determining the Variability

In an elementary stream, n of MPEG2 compressed video data, shown in FIG. 2, an Access Unit, j, is stamped with two critical pieces of information, namely Video Buffering Verifier Delay (vbv_delay) and Decode Time Stamp (DTS).

The MPEG2 definition of vbv_delay is "the number of periods of a 90 KHz clock derived from the 27 MHz system clock that the Video Buffering Verifier (VBV) shall wait after receiving the final byte of the picture start code before decoding the picture." In MPEG2 terminology, with parenthetical remarks inserted for clarity, VBV is "a hypothetical (video) decoder (including a video buffer) that is conceptually connected to the output of the (video) encoder. It's purpose is to provide a constraint on the variability of the data rate that an encoder or editing process may produce (to avoid the video decoder's buffer from overflowing or underflowing)." The value of vbv_delay is placed in the Picture Header.

In MPEG2 the DTS, placed in the Packetized Elementary Stream (PES) header of the jth Access Unit, "indicates the decoding time, tdn(j), in the system target decoder of an Access Unit j of elementary stream n". Specifically, for an Access Unit j, This DTS can be denoted as DTS(j). The value of DTS is also specified in units of the number of periods of a 90 KHz clock derived from the 27 MHz system clock.

The time of day at any instant is obtained from the Program Clock Reference (PCR), which is derived from the 27 MHz system clock. The 90 KHz component of the PCR is the Program Clock Reference Base (PCRB). In particular, the time of day at the instant that the vbv_delay occurs in Access Unit j is denoted as PCRB(j). FIG. 2 shows the relationships of DTS (part of the PES header), and vbv_delay, (part of the Picture Header), in Access Unit j, followed by the next Access Units up to Access Unit k, in an Elementary Stream, n.

The value of the vbv_delay in any Access Unit is related to the DTS in that Access Unit, and the time of day (the wall clock so to speak) at the time that vbv_delay is present in the Elementary Stream by the formula:

$$vbv\_delay = DTS - PCRB$$

Dividing all terms by 90,000 yields values in seconds.

Solving for time yields:

$$T = PCRB = DTS - vbv\_delay$$

In particular, for Access Unit j, the time of occurrence is:

$$t(j) = PCRB(j) = DTS(j) - vbv\_delay(j)$$

Likewise, for Access Unit (k), the time of occurrence is:

$$t(k) = PCRB(k) = DTS(k) - vbv\_delay(k)$$

Lapsed time between two Access Units within a transport stream can be found by:

$$\text{Lapsed time} = t(k) - t(j)$$

Where t(j) occurs before t(k), That is t(j)<t(k).

Lapsed time, TL, therefore equals:

$$TL = t(k) - t(j) = [DTS(k) - vbv\_delay(k)] - [DTS(j) - vbv\_delay(j)]$$

Regrouping yields:

$$TL = [DTS(k) - DTS(j)] + [vbv\_delay(j) - vbv\_delay(k)]$$

This final equation is the key element in understanding how to splice a local segment into a slot in the network stream.

Observe that [DTS(k)−DTS(j)] is the duration of the sequence of Access Units shown in FIG. 2, which represents the slot and the commercial playtime, or presentation time (perhaps a 30-second spot). The term [vbv_delay(j)−vbv_delay(k)] represents the variability or time tolerance of the slot duration.

As a numerical example, consider that the DTS value increments by 3000 from one Access Unit to the next one in a typical 30 Hz system. This is so because the DTS decode times are in units of the presentation picture rate. Therefore, in a typical commercial slot of 30 seconds, the difference between the two values of DTS {i.e., [DTS(k)–DTS(j)]} would be 2,700,000 which when divided by 90,000 equals 30 seconds. When multiplexed into transport stream, variability as to when an Access Unit is present in the stream is introduced by the difference between the two values of vbv_delay {i.e., [vbv_delay(j)–vbv_delay(k)]}. If the vbv_delay values were identical then the Access Units would be spaced in time by the exact difference between the respective DTS values. Determining the absolute worst case (maximum) variability is the next step Boundary Limits on Variability Unconstrained streams allow any value between zero and 45,000 for the vbv_delay. A time slot for a fixed presentation length commercial insert can thus vary by +/–45,000 periods of the 90 KHz clock. In terms of time, this represents +/–0.5 seconds when observed in real time in the transport stream. For example, a 30 second commercial slot that presents the decoded commercial to a viewer in exactly 30 seconds, will appear in the transport stream for a period of time offset from the nominal 30 seconds intended. The offset is determined by the difference between the vbv_delay after the last picture and the vbv_delay of the first picture, which, as derived, is +/–0.5 seconds.

When the vbv_delay at the first Access Unit (picture) of a sequence is equal to the vbv_delay after the last Access Unit (picture) in the sequence, the time slot within the transport stream will be equal to the differences between the ending and starting DTS values. This is the same amount of time that is finally presented when the stream is decoded. For example, a 30 second commercial slot that presents the decoded commercial to a viewer in exactly 30 seconds, would appear in the transport stream for exactly 30 seconds, when the vbv_delay after the last picture of the commercial is exactly equal to the vbv_delay of the first picture of the commercial. No specific values for vbv_delays are required, only that the two values are the same.

As mentioned earlier, knowing the start time and the final presentation duration of a commercial is insufficient to determine how to insert a compressed local commercial into the stream in the time slot provided by the network, when the compressed streams are not further constrained. The time slot in the stream is a variable equal to the presentation length of the slot plus or minus up to 0.5 seconds. Similarly the compressed commercial stored locally is of variable stream length equal to the presentation time plus or minus up to 0.5 seconds.

The Solutions

Several strategies can be undertaken to match the network Elementary Stream slot duration with the commercial slot duration or vice versa. The first strategy involves fixing the problem after the fact. This works when the local commercial is arranged to have the longest stream duration relative to the network slot. That is, if the network slot is nominally T seconds, then the commercial stream time is arranged, by vbv_delay manipulation, to have T+0.5 seconds duration. For example, a local compressed commercial would have the vbv_delays adjusted such that 30.5 seconds of compressed stream time are required when the presentation duration is nominally 30 seconds. It is understood that the nominal network slot duration an/or nominal commercial slot duration can vary without limitation (e.g., 15 sec., 30 sec., 1 min., 10 min., 30 min., 1 hr., multiple hours, etc. etc.).

Referring to FIG. 3, a nominal 30-second commercial has the vbv_delay adjusted so that the commercial duration is the longest possible, namely 30.5 seconds. The ideal case is that the +/–0.5-second variation of time in the network spot causes the spot to also be 30.5 seconds, so that the commercial fits in exactly. For all other shorter network slot duration, this strategy guarantees that the network feed will want to start playing program material before the time the local commercial has been fully multiplexed into the network stream. Since the network slot can end before the local commercial is finished, the network program must be stored in the splicer as is the case of normal splicer operation for two real-time streams. Once the network slot has ended, the remaining pictures from the local commercial can be multiplexed into the output transport stream at a higher rate. This closes the gap between the end of the network slot and the end of the local commercial. At the end of the commercial a splice returns the stream to the splicer stored network program. The vbv_delay is adjusted over multiple pictures of the resumed network stream until the vbv_delay in the outgoing stream matches the incoming network feed values.

A second strategy is to fix the problem before the fact. This works when the local commercial is arranged to have the shortest stream duration relative to the network slot. That is, if the network slot is nominally T seconds, then the commercial stream time is arranged, by vbv_delay manipulation, to have T–0.5 seconds duration. For example, a local compressed commercial would have the vbv_delays adjusted such that 29.5 seconds of compressed stream time are required when the presentation duration is nominally 30 seconds. Referring to FIG. 4, a nominal 30-second commercial has the vbv_delay adjusted so that the commercial duration is the shortest possible, namely 29.5 seconds. The ideal case is that the +/–0.5-second variation of time in the network spot causes the spot to also be 29.5 seconds, so that the commercial fits in exactly. For all other longer network slot durations, the network slot is monitored for the number of pictures remaining in the slot. When 29 seconds of the commercial have been output, fifteen pictures of commercial remain to be output and nominally 30 pictures of network slot remain. The actual number of network slot pictures remaining is determined from the difference between the slot duration and the number of pictures that have passed in the network stream since the start of the commercial. The output rate of the commercial pictures (Rn) is adjusted (lowered) to meet the expected completion time of the network slot. The expected completion time of the network slot equals the number of network slot pictures remaining multiplied by the picture rate. The output rate is adjusted on a picture by picture basis as the commercial pictures are output. The vbv_delay is adjusted over multiple pictures of the inserted commercial data stream until the vbv_delay in the outgoing inserted stream matches the incoming network feed values.

This strategy is the preferred embodiment.

A third strategy is a combination of the first two strategies. The stream from a remote source can be delayed by a fixed amount. This delay can provide a look ahead at the incoming stream. This look ahead provides opportunity to determine the duration of a stream time slot prior to its arrival into the internal splicing block. The vbv_delay of local commercials are adjusted to occupy the same amount of time in the transport stream as the presentation time. A nominal 30-second commercial would occupy the same time as the network slot despite the variations +/–0.5 seconds) of either the slot or the commercial. After splicing of the commercial, the delay buffer is monitored to determine the arrival of the end of the network slot. The local commercial vbv_delays can then be modified to cause the local commercial to end just after the network slot has ended, regardless of its time variation. This permits a smooth splice back to the network program that follows the network slot.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A method of splicing a stream of a commercial time slot into a network time slot of an incoming network stream, said commercial time slot and network time slot each having an in-point and an out-point and a duration, the method comprising:
    multiplexing the commercial stream into the network stream such that the commercial slot in-point is aligned with the network slot out-point;
    during the commercial stream, adjusting the vbv_delays of said stream such that the duration of the commercial stream has a maximum duration that is longer than the duration of the network time slot, any difference in durations being equal to a network feed extra;
    at the network stream in-point, multiplexing any remaining portion of the commercial stream at a higher stream rate, and storing any network feed extra; and
    at the commercial stream out-point, multiplexing any stored network feed extra into the network stream while adjusting the vbv_delays of the stored network feed extra until the vbv_delays in the network feed extra match that in the incoming network feed.

2. A method of splicing as recited in claim 1, wherein the duration of the commercial time slot is 30.5 seconds.

3. The method of claim 2,
    wherein the duration of the network time slot is based on a Decode Time Stamp and a network time slot duration time tolerance; and
    wherein any stored feed extra is at least as large as the difference between the 30.5 seconds and the network time slot duration.

4. A method of splicing a stream of a commercial time slot into a network time slot of an incoming network stream, said commercial time slot and network time slot each having an in-point and an out-point and a duration, the method comprising:
    multiplexing the commercial stream into the network stream such that the commercial slot in-point is aligned with the network slot out-point;
    while multiplexing the commercial stream into the network stream, computing an expected completion time of the network time slot by monitoring the network feed, and adjusting the vbv_delays of the commercial stream such that the duration of the commercial stream has a minimum duration that is shorter than the duration of the network time slot;
    between a prescribed point prior to the out-point of the commercial time slot and the out-point of the commercial time slot, multiplexing the remaining portion of the commercial stream at a slower stream rate by adjusting the vbv_delays to meet the expected completion time; and
    at the network in-point, multiplexing the incoming network feed into the network stream.

5. The method of claim 4, wherein the minimum duration is 29.5 seconds.

6. The method of claim 5,
    wherein the network time slot duration is based on a Decode Time Stamp and a network time slot duration time tolerance and the prescribed point is 29 seconds, the remaining portion of the commercial time slot including 15 pictures; and
    wherein the slower stream rate for the remaining portion of the commercial stream is based on taking the difference between the duration of the network time slot and 29.5 seconds.

7. A method of splicing as recited in claim 4, wherein computing the expected completion time includes:
    computing a difference between the number of pictures in the network slot and the number of pictures that have passed in the network stream since the commercial in-point; and
    multiplying the difference by the picture rate.

* * * * *